(12) United States Patent
Suresh et al.

(10) Patent No.: US 9,054,800 B2
(45) Date of Patent: Jun. 9, 2015

(54) STAGING A MOBILE DEVICE WITH VISIBLE LIGHT COMMUNICATION

(71) Applicant: SYMBOL TECHNOLOGIES, INC., Lincolnshire, IL (US)

(72) Inventors: Raj V. A. Suresh, Bangalore (IN); Jeelan Poola, Bangalore (IN); Sundaresan Sundaram, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/024,069

(22) Filed: Sep. 11, 2013

(65) Prior Publication Data
US 2015/0071647 A1    Mar. 12, 2015

(51) Int. Cl.
*H04B 10/00* (2013.01)
*H04B 10/116* (2013.01)

(52) U.S. Cl.
CPC .................................... *H04B 10/116* (2013.01)

(58) Field of Classification Search
CPC .............. H04B 10/112; H04B 10/116; H04B 10/1123; H04B 10/1129; H04B 10/114; H04B 10/1143; H04B 10/1149
USPC .......................... 398/118, 127, 128, 135, 172
See application file for complete search history.

(56) References Cited

U.S. PATENT DOCUMENTS

| | | |
|---|---|---|
| 6,864,860 B1 | 3/2005 | Zien |
| 2006/0026692 A1* | 2/2006 | Lakhani .......................... 726/28 |
| 2006/0067707 A1 | 3/2006 | Maniam |
| 2007/0147843 A1 | 6/2007 | Fujiwara |
| 2011/0170872 A1 | 7/2011 | Shin |
| 2011/0205944 A1 | 8/2011 | Miyabayashi |
| 2011/0296189 A1 | 12/2011 | Sakumoto |
| 2012/0015954 A1 | 1/2012 | Sun |
| 2012/0045215 A1 | 2/2012 | Kim |
| 2012/0100831 A1 | 4/2012 | Rantanen |
| 2012/0106977 A1 | 5/2012 | Ma |
| 2012/0128365 A1 | 5/2012 | Paek |
| 2012/0179906 A1 | 7/2012 | Choi |
| 2014/0070699 A1* | 3/2014 | Genthon et al. ................. 315/82 |
| 2014/0327364 A1* | 11/2014 | Bischof et al. ................ 315/158 |

FOREIGN PATENT DOCUMENTS

| | | |
|---|---|---|
| EP | 2339762 A1 | 6/2011 |
| WO | 2010112064 A1 | 10/2010 |
| WO | WO2011137100 A1 | 11/2011 |

* cited by examiner

*Primary Examiner* — Dalzid Singh

(57) ABSTRACT

A system configures a mobile device. The system includes a visible light communication (VLC) transmitter and a mobile device. The VLC transmitter is configured to emit a visible light signal corresponding to staging profile data, the staging profile data including configuration data. The mobile device includes a VLC receiver configured to receive the visible light signal, the visible light signal being converted to generate the staging profile data, the staging profile data automatically configuring the mobile device for communicating with a communication network as a function of the configuration data.

20 Claims, 3 Drawing Sheets

SYSTEM
200

STAGING A MOBILE DEVICE WITH VISIBLE LIGHT COMMUNICATION

BACKGROUND OF THE INVENTION

A mobile unit (MU) may be configured with a transceiver to communicate with a communication network. However, in order for the MU to properly connect to the network, the MU has to initially be configured to be managed and be discovered by a management system of the network. Specifically, the MU has to be staged that enables the configuration of the MU. Staging is a process of quickly preparing the MU to deploy into an enterprise by providing settings to configure connectivity to the enterprise network, to configure access to a deployment server, and to specify the deployment to be performed.

Conventional manners of staging the MU are often time consuming and may be inefficient. In a first example, a manual staging process may be performed. However, a manual staging requires the user to manually enter all the required settings. In a second example, staging of the MU may utilize short message service (SMS) messages. In SMS staging, a services platform converts a selected staging profile into a sequence of encrypted SMS messages to the MU using one or more carriers. The SMS messages may be delivered to devices via email to SMS gateways provided by the carriers and/or via short message peer-to-peer protocol (SMPP) gateways contracted for with the carriers. However, with SMS staging, a variety of information is required prior to delivery of the staging profile such as phone number, equipment identification, carrier, etc. Depending on the method of delivery, the messages may be delivered slowly or delayed resulting in an increased time for staging. The manner for delivering the staging profile by the carriers may also be limited such as restrictions or capabilities of the carrier. Also depending on the manner for delivering the staging profile, a fee may be assessed by the carrier. In a third example, specialized staging manners may be used in which specialized components are required in addition to the components of the MU in order to receive the staging profile. However, if the MU does not include these specialized components, the staging profile may not be received by the MU using the respective specialized staging manner.

The MU may also be configured with a visible light sensor or an imager that captures an image. The visible light sensor provides an ambient lighting condition to be determined Specifically, using the visible light spectrum, the sensor determines whether the MU is disposed in an environment having high ambient light, standard ambient light, or low ambient light. Subsequent processes may be performed based upon this determination such as decreasing or increasing an intensity of a backlight of a display device. The imager such as a camera may also capture a scene based upon the visible light spectrum. Accordingly, a photo may be captured using the imager. However, the sensor and imager are often used exclusively for only the above described purposes.

Accordingly, there is a need for taking advantage of already existing components utilizing the visible light spectrum in order to stage the MU.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
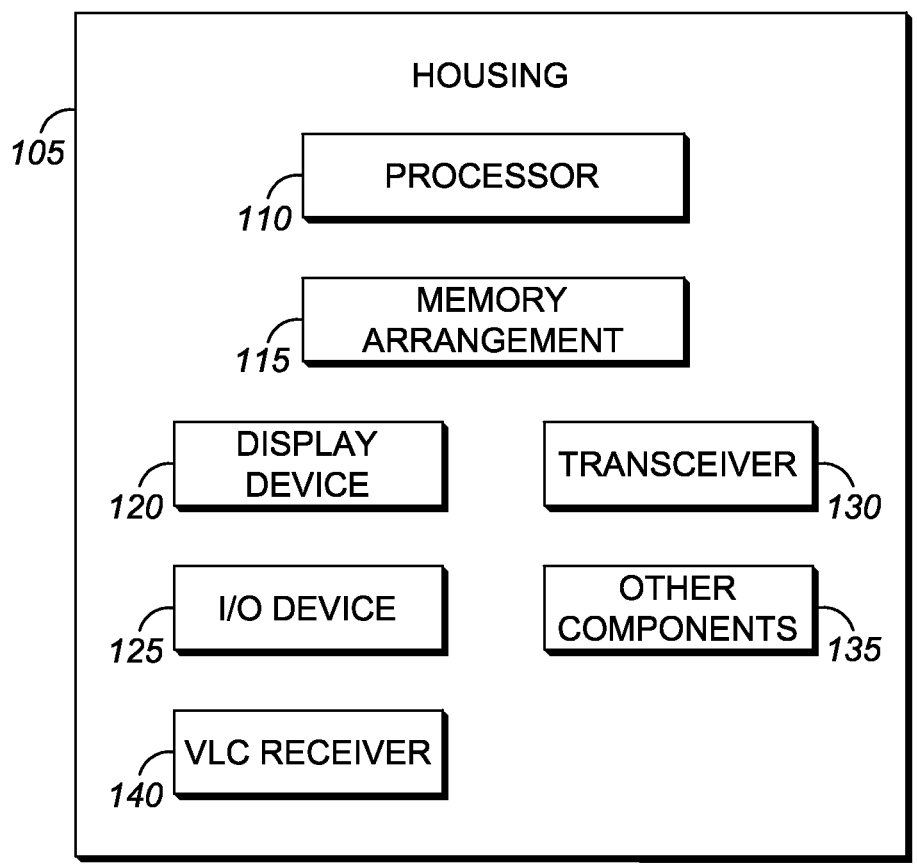
FIG. 1 shows a mobile unit with a visible light sensor in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present invention relates to a system that configures a mobile device. The system comprises a visible light communication (VLC) transmitter configured to emit a visible light signal corresponding to staging profile data, the staging profile data including configuration data; and a mobile device including a VLC receiver configured to receive the visible light signal, the visible light signal being converted to generate the staging profile data, the staging profile data automatically configuring the mobile device for communicating with a communication network as a function of the configuration data.

The exemplary embodiments may be further understood with reference to the following description and the appended drawings, wherein like elements are referred to with the same reference numerals. The exemplary embodiments describe a system and method for staging a mobile unit (MU) such that the MU is configured to be managed and discovered on a management system of a network. Specifically, the staging of the MU is performed by converting staging profile data into a modulated light signal using a Visible Light Communication (VLC) transmitter. A VLC receiver of the MU may receive the modulated light signal for subsequent processing in order to extract the staging profile data. Once extracted, the staging profile data may allow the settings provided in the staging profile data to properly configure the MU for the management system. The MU, the staging, the management system of the network, the staging profile data, the VLC transmitter, the VLC receiver, and a related method will be discussed in further detail below.

With regard to a management system of a network, in order for the MU to properly be managed and discovered by the management system, the MU must be properly configured. Accordingly, a staging profile corresponding to the specifications of the MU must be installed thereon in order for the MU to be properly configured. The staging profile includes staging profile data that may be stored intermediately on a memory arrangement of another component and transmitted to the MU. Once the staging profile data has been received by the MU, the staging profile data may be used to stage the MU. As will be described in further detail below, the staging data may be stored on a memory arrangement of a VLC transmitter that converts the staging data into a modulated light signal for transmission to a VLC receiver of the MU.

FIG. 1 shows a MU 100 with a VLC receiver 140 in accordance with some embodiments. The MU 100 may include a plurality of components. For example, the MU 100 may include a housing 105 that at least partially houses a plurality of electronic components such as a processor 110, a memory arrangement 115, a display device 120, an input/output (I/O) device 125, a transceiver 130, and other components 135 such as an antenna coupled to the transceiver 130, an audio output component (e.g., a speaker (not shown)); an audio input component (e.g., a microphone (not shown)); a portable power supply; etc.

The MU 100 may be any electronic device configured to connect to a communication network having a management system. For example, the MU 100 may be a laptop, a cellular phone, a smartphone, a personal digital assistant, a tablet, a barcode scanner, etc. including the transceiver 130 that enables the MU 100 to transmit/receive data from the network. As will be described in further detail below, the management system of the network may be a mobility services platform (MSP).

The processor 110 may be configured to execute a plurality of applications. For example, when the MU 100 is connected to a network via the transceiver 130, the processor 110 may execute a web browser application. According to the exemplary embodiments, the processor 110 may execute a staging application in which staging profile data that is received may be used to configure the transceiver 130 for discovery and management by a management system of a network. The memory arrangement 115 may store data for the MU 100, particularly the staging profile data that is received. The display device 120 may show data to a user while the I/O device 125 may receive inputs from the user. The I/O device 125 may be incorporated with the display device 120 such that a touchscreen is provided.

The VLC receiver 140 may be a component that is configured to receive a light signal in the visible spectrum. Specifically, the light signal may be generated using visible light between 390 to 700 nm in wavelength (i.e., 430-790 THz frequency). The VLC receiver 140 may be a separate component of the MU 100 or may be an application of an existing component of the MU 100.

In a first exemplary embodiment, the MU 100 may include the VLC receiver 140 that is disposed at least partially in the housing 105 such that the receiving portion of the VLC receiver 140 is exposed to an exterior. Thus, when the processor 110 executes a VLC application, the light signal that is received via the separate VLC receiver 140 may be processed. The VLC receiver 140 may also be removably attached or connected such as with a Universal Serial Bus (USB) cable.

In a second exemplary embodiment, the processor 110 of the MU 100 may activate an existing component to receive the light signal and execute the VLC application. In a first example, the MU 100 may activate a light sensor such as one used to detect ambient lighting conditions. The MU 100 may include this light sensor to determine an amount of light present in an environment that the MU 100 is disposed. The MU 100 may ordinarily use the data of the light sensor to perform a variety of different operations such as determining an intensity of backlight to be used with the display device 120. However, according to the exemplary embodiments, the light sensor may also be used to receive the light signal. As the light sensor is configured to operate in the visible spectrum, the light signal may also be received via the light sensor. In a second example, the MU 100 may activate an imager such as a camera. The MU 100 may include this imager to capture images such as photos. The imager may also be used for other purposes such as capturing barcodes. However, according to the exemplary embodiments, the imager may also be used to receive the light signal. As the imager is also configured to operate in the visible spectrum, the light signal may also be received via the imager.

As will be described in further detail below, the VLC application may be preprogrammed with instructions as to a manner of decoding the received light signal. The similar algorithm used to decode the received light signal may be used to convert the staging profile data into the light signal. In this manner, the MU 100 is configured to extract the staging profile data from the light signal.

Figure 2:
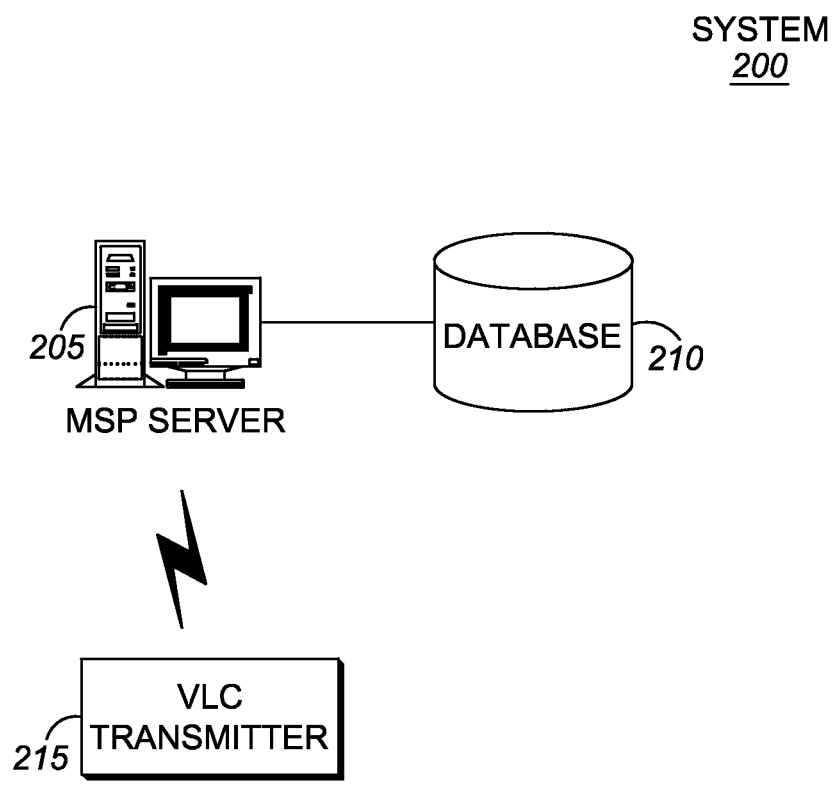
FIG. 2 shows a system for staging the mobile unit of FIG. 1 in accordance with some embodiments.

In order to provide the light signal to the VLC receiver 140, a VLC transmitter may be used. FIG. 2 shows a system 200 for staging the MU 100 of FIG. 1 in accordance with some embodiments. Specifically, the system 200 relates to when the staging profile data is for a management system of an enterprise network that the MU 100 is to be managed and discovered. Accordingly, the system 200 may include a server 205, a database 210, and a VLC transmitter 215. As discussed above, the management system may be a MSP in which the server 205 may be the MSP server. Therefore, when the MU 100 is properly configured, the server 205 may discover and manage the MU 100 upon connection to the network. The database 210 may store the staging profile data for each MU that is to connect to the network.

In a first exemplary embodiment, the VLC transmitter 215 may be a separate component with a respective processor and memory arrangement. The VLC transmitter 215 may also be configured with a data communication means to receive the staging profile data. Thus, the VLC transmitter 215 may communicate with the server 205 in order to receive the staging profile data. A data communication link between the server 205 and the VLC transmitter 215 may be established using any variety of manners. In a first example, the server 205 may include a transceiver that establishes a link with a transceiver of the VLC transmitter 215. Thus, the staging profile data may be wirelessly transmitted. In a second example, the VLC transmitter 215 may include a port such that a hard-wired connection may be established with the server 205. Accordingly, the staging profile data may be transmitted. In a third example, other known manners of data transmission may be used so long as the VLC transmitter 215 includes the necessary hardware components to utilize the data transmission manner (e.g., RFID, IR, Bluetooth, scanning, etc.).

In a second exemplary embodiment, the VLC transmitter 215 may be a component of the server 205. That is, the VLC transmitter 215 may include at least one light emitting diode (LED) while the processor of the server 205 is configured to control the activation of the LED. The VLC transmitter 215 may be at least partially disposed in a housing of the server 205 and oriented such that the LED faces an exterior. The VLC transmitter 215 may also be a module that is connected to the server 205 in a manner substantially similar to a mouse to a desktop computer. In this way, the VLC transmitter 215 may be used by being freely moveable in space to properly orient the LED toward the VLC receiver 140.

The VLC transmitter 215 or the database 210 may store the staging profile data in a variety of manners. The embodiments below describe storing the staging profile data in the memory arrangement of the VLC transmitter 215. In a first example, the VLC transmitter 215 may store only the necessary staging profile data. That is, only the staging profile data related to the MU 100 may be stored. The server 205 and/or the VLC transmitter 215 may determine the staging profile data of the MU 100 in a variety of ways such as utilizing parameters of the MU 100 or identification data of the MU 100 to determine the type of MU 100. In a second example, the VLC transmitter 215 may store all the staging profile data. Thus, when the VLC transmitter 215 is to be used, the appropriate staging profile data may be selected for emission.

Once the VLC transmitter 215 has received the staging profile data and stored the data, the VLC transmitter 215 may convert the staging profile data into a corresponding light signal using a predetermined conversion algorithm (that is also known by the processor 110 of the MU 100). However, it should be noted that the server 205 may convert the staging profile data into the corresponding light signal data prior to being received by the VLC transmitter 215. The VLC transmitter 215 may be activated to begin the emission of the light signal. It may be assumed that the MU 100 is properly positioned and oriented such that the light signal is received by the VLC receiver 140. In an initial step, the VLC transmitter 215 may be configured to determine whether the MU 100 is authorized to receive the staging profile data. For example, the specifications of the MU 100 or authenticating data may be transmitted to the VLC transmitter 215 (or server 205) to make the determination. If allowed, the VLC transmitter 215 may begin the emission of the light signal. When the VLC transmitter 215 only stores the corresponding staging profile data of the MU 100, the correct light signal may be emitted to the VLC receiver 140. When the VLC transmitter 215 stores all the staging profile data for multiple MUs, the VLC transmitter 215 may determine the staging profile data to be transmitted to the MU 100 or a specific request for a particular staging profile data that is stored may be provided.

The light signal that is generated may be a modulated light signal. For example, the LED of the VLC transmitter 215 may emit a white light. The LED may be activated and deactivated according to a pattern indicated by the data of the modulated light signal. In another example, the VLC transmitter 215 may include a plurality of LEDs that each generate a respective color of visible light. The LEDs may be activated and deactivated to generate a color pattern indicated by the data of the modulated light signal.

The conversion of the staging profile data may be performed in a variety of manners. For example, a direct conversion from the actual staging profile data may be performed. However, the staging profile data may be encrypted prior to the conversion. In a first example, the staging profile data stored in the database 210 may already be encrypted. Thus, when the VLC transmitter 215 is communicatively coupled to the server 205, the server 205 may simply transmit the encrypted data to the VLC transmitter 215. In a second example, the staging profile data may be retrieved by the server 205 from the database 210 and encrypted prior to transmission to the VLC transmitter 215. In a third example, the staging profile data may be transmitted to the VLC transmitter 215 in an unencrypted manner for subsequent encryption by the VLC transmitter.

It should be noted that the conversion algorithm for the light signal may provide sufficient security. Accordingly, an encryption scheme may not be used. However, to provide further security, the staging profile data may be encrypted, then converted to the light signal for emission.

Once the light signal has been received by the VLC receiver 140 of the MU 100 from the VLC transmitter 215, the processor 110 may execute the VLC application in order to convert the light signal into corresponding data. If no encryption scheme was used, the corresponding data results in the staging profile data. If an encryption scheme was used, the corresponding data is first decrypted such that the staging profile data is extracted. The processor 110 may include a decryption application that is executed in order to decode the encrypted staging profile data. Accordingly, the database 210, the server 205, the VLC transmitter 215, and/or the processor 110 may be configured with the encryption algorithm used to encrypt the staging profile data.

The staging profile data may now be used by the staging application executed by the processor 110 in order to configure the MU 100 with the settings indicated therein for discovery and management by the management system of the network upon connection thereto.

Figure 3:
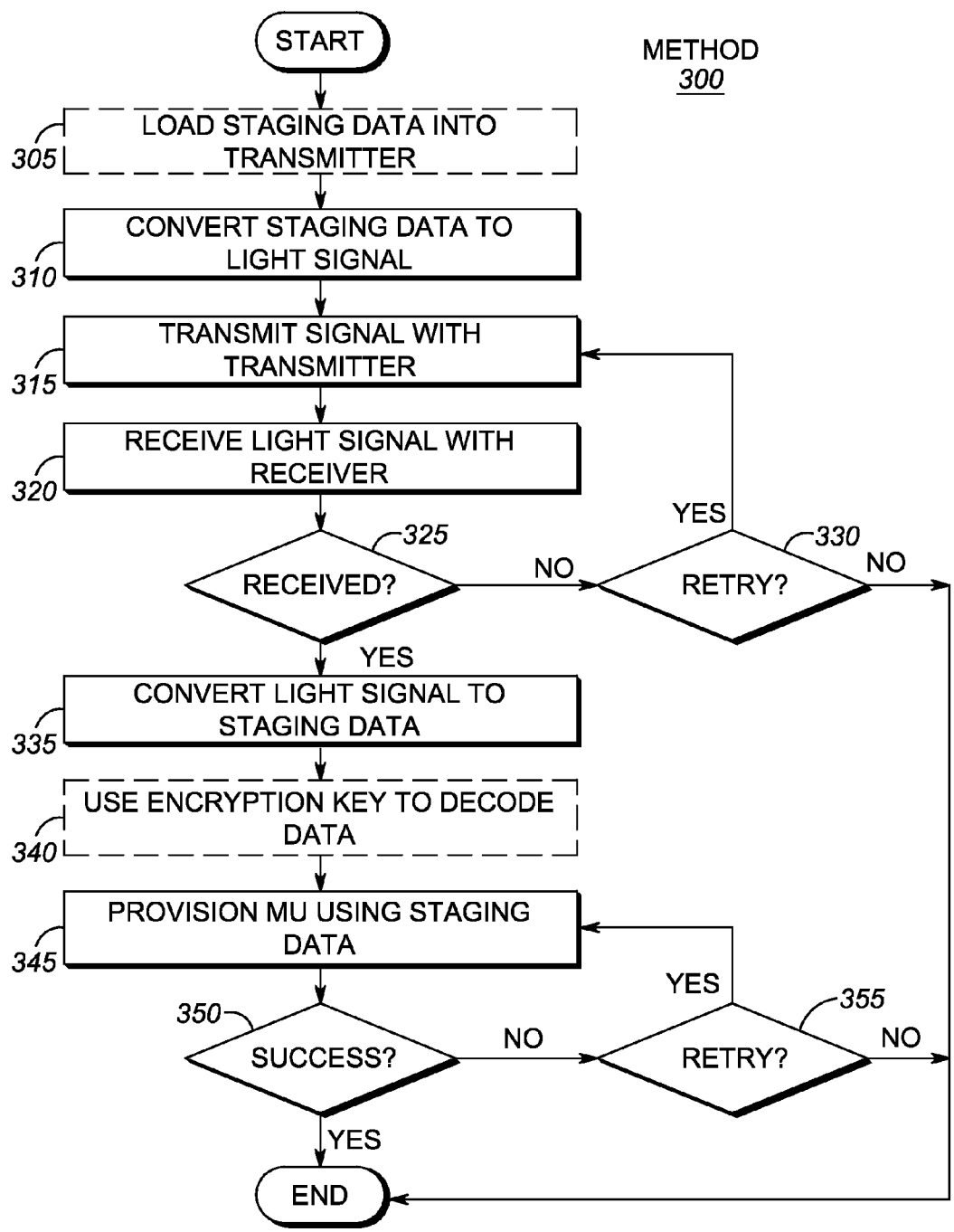
FIG. 3 shows a method for staging the mobile unit of FIG. 1 in accordance with some embodiments.

FIG. 3 shows a method 300 for staging the MU 100 of FIG. 1 in accordance with some embodiments. The method 300 relates to providing the MU 100 staging profile data via the VLC receiver 140 that receives a light signal from the VLC transmitter 215. The method 300 will be described with reference to the MU 100 of FIG. 1 and the system 200 of FIG. 2.

In step 305, the staging profile data is loaded onto the VLC transmitter 215. As described above, the VLC transmitter 215 may establish a communicative connection to the server 205 using any of a variety of manners. The server 205 may retrieve the staging profile data from the database 210 for transmission to the VLC transmitter 215. The server 205 may transmit a specific staging profile data or may transmit a plurality of profile staging data to the VLC transmitter 215 to be loaded thereon. Also as described above, the staging profile data may be encrypted by the server 205/the database 210 prior to transmitting the data or by the VLC transmitter 215 upon receiving the staging profile data.

In step 310, the VLC transmitter 215 converts the staging profile data into a light signal. Using a predetermined conversion algorithm, the VLC transmitter 215 may convert the staging profile data into a corresponding light signal. However, as discussed above, the server 205 may perform this conversion such that the VLC transmitter 215 receives an already converted light signal that corresponds to the staging profile data. Also, when the staging profile data is encrypted, the conversion algorithm may be applied to the encrypted data to generate the light signal.

In step 315, the light signal is emitted from the VLC transmitter 215 so that in step 320, the light signal is received by the VLC receiver 140. In step 325, a determination is made whether the light signal has been properly received. There may be a variety of factors that may cause the light signal to be improperly received. For example, human error in which the VLC receiver 140 is no longer in the line of sight of the light signal being emitted by the VLC transmitter 215 may cause a portion of the light signal to not be received. Thus, if the light signal is not received, the method 300 continues to step 330. In step 330, if a first attempt to receive the light signal fails, a determination is made whether a further attempt is to be performed. If a further attempt is to be made, the method 300 returns to step 315. If no further attempts are to be made, the method 300 ends.

Returning to step 325, if the light signal has been received by the VLC receiver 140, the method 300 continues to step 335. In step 335, the processor 105 converts the light signal to corresponding data using the conversion algorithm used to convert the staging profile data (or encrypted data) to the light signal. The method 300 may include an additional step in which a checksum may be used to determine whether the conversion was properly performed. If not properly converted, the method may perform a retry. In step 340, an encryption key preprogrammed in the processor 105 (via the staging application) may be used to decode the encrypted staging profile data that was converted from the light signal. One decoded, the method 300 continues to step 345 where the MU 100 is provisioned using the staging profile data. That is, the processor 105 executes the staging application to configure the transceiver 130 with the settings included in the staging profile data.

In step 350, a determination is made whether the MU 100 has been successfully configured with the staging profile data. If the configuration has failed, the method 300 continues to step 355. In step 355, a determination is made whether a further attempt is to be performed. If a further attempt is to be made, the method 300 returns to step 345. If no further attempts are to be made, the method 300 ends.

The exemplary embodiments provide a system and method for staging a MU by providing staging profile data to the MU using a visible light communication means. Specifically, a VLC transmitter may receive staging profile data for conversion into a light signal. Once converted, the VLC transmitter may emit the light signal toward a VLC receiver of the MU. The MU may receive the light signal in this manner and convert the light signal back into the staging profile data. Upon receiving this staging profile data, the MU may be staged by being configured with the settings indicated by the staging profile data. In this manner, the MU may be properly connected to the network having a management system for discovery and management thereby.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system, comprising:
  a visible light communication (VLC) transmitter configured to emit a visible light signal corresponding to staging profile data, the staging profile data including configuration data for configuring a mobile device for network communication; and
  a mobile device including a VLC receiver configured to receive the visible light signal, the visible light signal being converted to generate the staging profile data, the configuration data in the staging profile data being used for automatically configuring the mobile device for discovery and management by a management system of a communication network upon connection thereto.

2. The system of claim 1, wherein the VLC transmitter is a component of a mobility services platform (MSP) server of the communication network.

3. The system of claim 2, wherein the mobile device is authenticated by the MSP server prior to the VLC transmitter transmitting the visible light signal to the VLC receiver.

4. The system of claim 1, wherein the VLC transmitter includes a processor configured to determine whether the mobile device is authorized to receive the staging profile data.

5. The system of claim 1, wherein the VLC transmitter includes a memory arrangement configured to store the staging profile data.

6. The system of claim 5, wherein the staging profile data includes a plurality of staging profiles, a user of the mobile device selecting one of the plurality of staging profile data for automatically configuring the mobile device.

7. The system of claim 1, wherein the VLC transmitter converts the staging profile data into the visible light signal.

8. The system of claim 7, wherein the staging profile data generated by the MSP server is encrypted such that the VLC transmitter converts an encrypted staging profile data corresponding to the staging profile data into the visible light signal.

9. The system of claim 8, wherein the VLC receiver converts the visible light signal to the encrypted staging profile data.

10. The system of claim 9, wherein the mobile device decrypts the encrypted staging profile data into the staging profile data.

11. A method, comprising:
emitting, by a visible light communication (VLC) transmitter, a visible light signal corresponding to staging profile data, the staging profile data including configuration data for configuring a mobile device for network communication;
receiving, by a VLC receiver of a mobile device, the visible light signal, the visible light signal being converted to generate the staging profile data; and
automatically configuring the mobile device with the staging profile data, wherein the configuration data in the staging profile data is used for automatically configuring the mobile device for discovery and management by a management system of a communication network upon connection thereto.

12. The method of claim 11, wherein the VLC transmitter is a component of a mobility services platform (MSP) server of the communication network.

13. The method of claim 12, further comprising:
authenticating, by the MSP server, the mobile device prior to the VLC transmitter transmitting the visible light signal to the VLC receiver.

14. The method of claim 11, further comprising:
determining, by a processor of the VLC transmitter, whether the mobile device is authorized to receive the staging profile data.

15. The method of claim 11, further comprising:
storing the staging profile data on a memory arrangement of the VLC transmitter.

16. The method of claim 15, further comprising:
when the staging profile data includes a plurality of staging profiles, receiving a selection of one of the plurality of staging profile data for automatically configuring the mobile device.

17. The method of claim 11, wherein the staging profile data is encrypted such that the VLC transmitter converts an encrypted staging profile data corresponding to the staging profile data into the visible light signal.

18. The method of claim 17, further comprising:
converting the visible light signal to the encrypted staging profile data.

19. The method of claim 18, further comprising:
decrypting the encrypted staging profile data into the staging profile data.

20. A mobile device, comprising:
a visible light communication (VLC) receiver configured to receive a visible light signal from a VLC transmitter, the visible light signal corresponding to staging profile data, the staging profile data including configuration data for configuring the mobile device for network communication; and
a processor configured to convert the visible light signal to generate the staging profile data, wherein the configuration data in the staging profile data is used for automatically configuring the mobile device for discovery and management by a management system of a communication network upon connection thereto.

* * * * *